United States Patent [19]

Itoh

[11] Patent Number: 5,369,239

[45] Date of Patent: Nov. 29, 1994

[54] METHOD AND APPARATUS FOR SINK-TYPE ELECTRICAL DISCHARGE MACHINING WITH CONTROL OF PYROGRAPHITE BUILDUP

[75] Inventor: Tetsuro Itoh, Rolling Meadows, Ill.

[73] Assignee: Mitsubishi Denki Kabushiki Kaisha, Tokyo, Japan

[21] Appl. No.: 884,131

[22] Filed: May 18, 1992

[51] Int. Cl.⁵ .............. B23H 1/02; B23H 7/18; B23H 7/16
[52] U.S. Cl. .............. 219/69.13; 219/69.16; 219/69.17; 219/69.18
[58] Field of Search .............. 219/69.17, 69.16, 69.2, 219/69.15, 69.14, 69.13, 69.18

[56] References Cited

U.S. PATENT DOCUMENTS

| | | | |
|---|---|---|---|
| 3,654,420 | 4/1972 | Saito et al. | 219/69.16 |
| 3,987,269 | 10/1976 | Inoue et al. | 219/69.17 |
| 3,999,028 | 12/1976 | Saito et al. | 219/69.13 |
| 4,045,641 | 8/1977 | Ullmann et al. | 219/69.17 |
| 4,185,184 | 1/1980 | Pfau | 219/69.16 |
| 4,323,749 | 4/1982 | Mazond et al. | 219/69.17 |
| 4,400,606 | 8/1983 | Itoh et al. | 219/69.17 |
| 4,521,660 | 6/1985 | Inoue | 219/69.17 |
| 4,700,038 | 10/1987 | Dauw | 219/69.18 |
| 4,952,790 | 8/1990 | Futamura | 219/69.13 |
| 5,023,421 | 6/1991 | Bouchoud | 219/69.16 |
| 5,224,048 | 6/1993 | Ohba et al. | 219/69.13 |

FOREIGN PATENT DOCUMENTS

| | | | |
|---|---|---|---|
| 278524 | 5/1990 | German Dem. Rep. | 219/69.13 |
| 54-99296 | 8/1979 | Japan | 219/69.18 |
| 55-5217 | 1/1980 | Japan | 219/69.13 |
| 55-48528 | 4/1980 | Japan | 219/69.13 |
| 58-40225 | 3/1983 | Japan | 219/69.17 |
| 61-288934 | 12/1986 | Japan | 219/69.16 |
| 62-107923 | 5/1987 | Japan | 219/69.13 |

*Primary Examiner*—Geoffrey S. Evans
*Attorney, Agent, or Firm*—Sughrue, Mion, Zinn, Macpeak & Seas

[57] ABSTRACT

A touch-type sensor is employed to detect the precise location of a corner of a machining electrode that may be susceptible to pyrographite buildup prior to actual machining of a workpiece. By detecting the precise location in this manner, a base or origin value can be maintained for subsequent comparison when the electrode is periodically checked for icicle formation or electrode erosion. When a deviation from the base or origin value is determined, one or more of a plurality of machining parameters, such as machining on time, wear ratio, fluid flow rate, or jumping height is modified in accordance with the amount of deviation detected. In order to further optimize the machining rate of the workpiece, the surface area of the electrode is periodically determined. The aforementioned machining parameters are varied accordingly, so that the optimum average current across the inter-electrode gap, as it relates to surface area, may be maintained. Furthermore the temperature at the surface of the machining electrode can be periodically determined. As the temperature at the surface approaches the critical temperature for pyrographite buildup and the like, the machining parameters can be modified to achieve the optimum machining rate.

16 Claims, 6 Drawing Sheets

METHOD AND APPARATUS FOR SINK-TYPE ELECTRICAL DISCHARGE MACHINING WITH CONTROL OF PYROGRAPHITE BUILDUP

BACKGROUND OF THE INVENTION

The present invention relates to an electric discharge machining (EDM) apparatus for and method of machining a workpiece submerged in a machining solution. More specifically, the invention relates to an apparatus for and method of optimizing machining of the workpiece.

Figure 1:
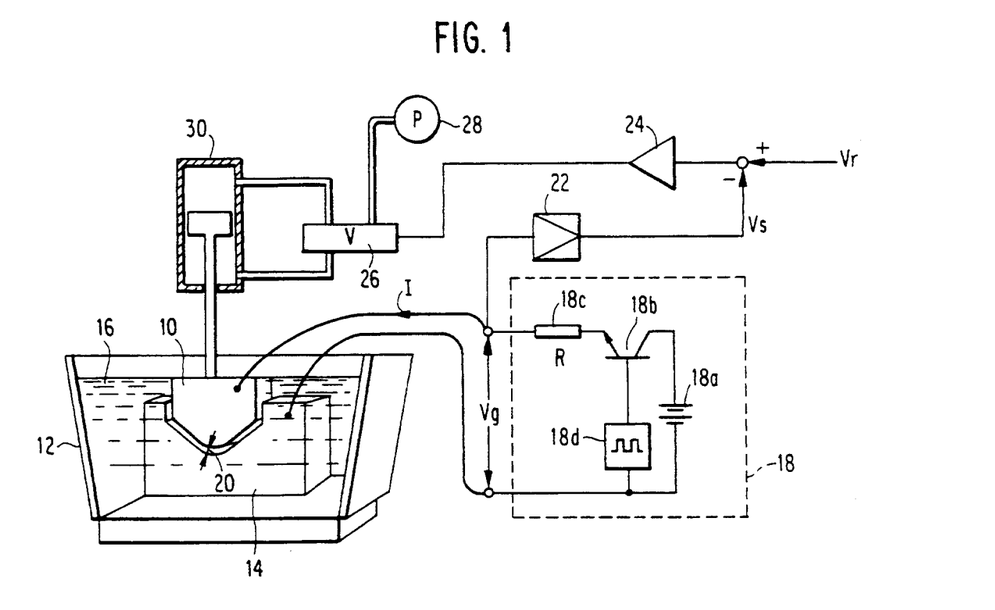
FIG. 1 illustrates a conventional electric discharge machining (EDM) apparatus.
Figure 2A:
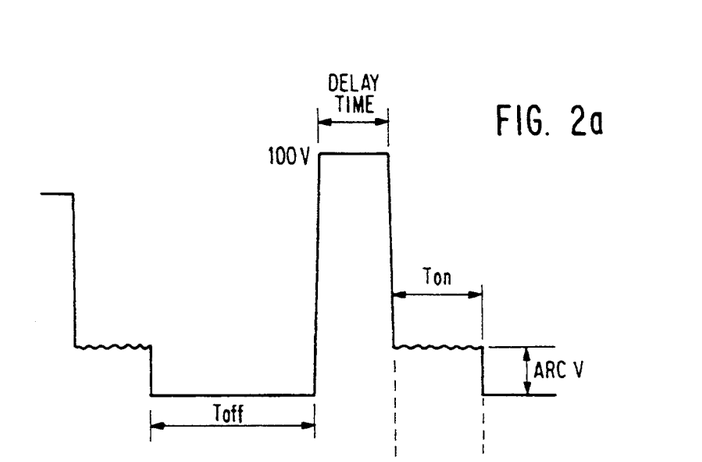
FIGS. 2a and 2b respectively illustrate the machining on and off times of the EDM apparatus shown in FIG. 1.
Figure 2B:
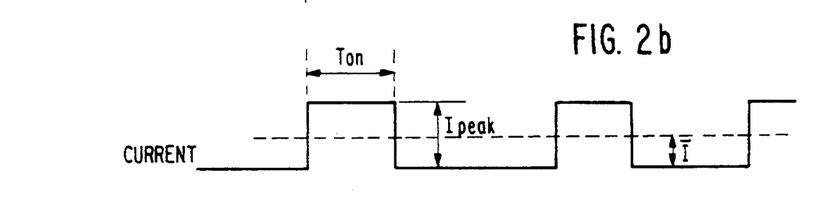

In a conventional electric discharge machining apparatus, a workpiece is machined by applying a discharge current across an electrode and a workpiece. Typically, the electrode is made of a graphite material formed in a given shape or contour. The workpiece is machined to have a configuration which conforms with the contour of the electrode. Such a conventional EDM apparatus is shown in FIG. 1. As shown in the FIGURE, an electrode 10 is driven in a vertical direction (Z-axis direction) by a selection and drive circuit composed of elements 26, 28, and 30. Such an apparatus is widely known as a die-sinking EDM apparatus, which is extremely effective for manufacturing dies that have complicated constructions. Die-sinking EDM apparatuses have been previously disclosed in, for example, Japanese published patent application no. 3594/1966, and U.S. Pat. No. 4,400,606, both of which are herein incorporated by reference.

In operation, the EDM apparatus shown in FIG. 1 uses electrical discharge to machine the workpiece 14. Further, the electrode 10 is responsive to a feedback voltage that causes the electrode 10 to move upward or downward in accordance with its value. During this motion, an electric voltage $V_g$ is produced by a machining electric source 18, which is made up of a DC source 18$a$, a switching element 18$b$, a current limiting resistor 18$c$, and a pulse generator 18$d$. A periodic output from the electric source 18 creates a potential difference between the electrode 10 and the workpiece 14. The gap 20 formed between the electrode 10 and the workpiece 14 is known as the "interelectrode gap," and the voltage drop across that gap is represented in the FIGURE as $V_g$. The workpiece 14 and the electrode 10 are submerged in a tank 12 filled with machining solution 16, as is the inter-electrode gap 20. When the voltage across the gap $V_g$ reaches a predetermined level, an electric discharge or arc is formed across the inter-electrode gap 20. As a result, the arc passes from the electrode 10 and terminates on the workpiece 14, creating a high temperature explosion at the workpiece, thus causing the workpiece surface to decompose. Typically, the surface is melted and dispersed as re-solidified chips that are retained in the machining gap 20. Due to a pumping action of the electrode 10 caused by a periodic up-and-down "jump" of the electrode, the machining solution washes most of the chips out of the gap 20.

The voltage $V_g$ is also supplied to amplifier 22 and is used as a feedback signal $V_s$. This signal $V_s$ is subtracted from the reference voltage $V_r$ and the resulting signal is output from amplifier 24 to control the position of the electrode 10.

Although the above-described EDM apparatus is advantageous in that a workpiece can be machined without being restricted by the hardness of the work material and the shape that is to be machined, the EDM apparatus cannot operate at an optimal machining or removal rate when it is required to machine workpieces having high-tolerance corners and the like.

Figure 3A:
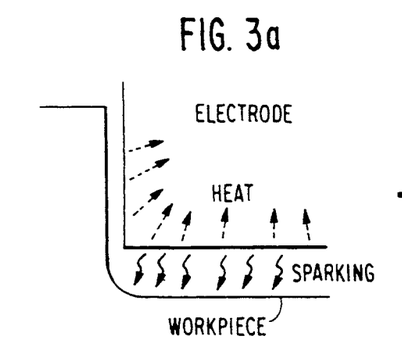
FIGS. 3a through 3d illustrate pyrographite buildup at one corner of a machining electrode.
Figure 3B:
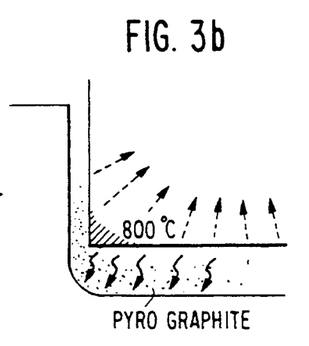
Figure 3C:
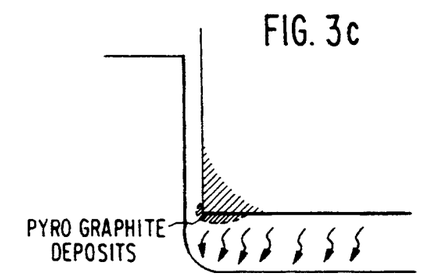
Figure 3D:
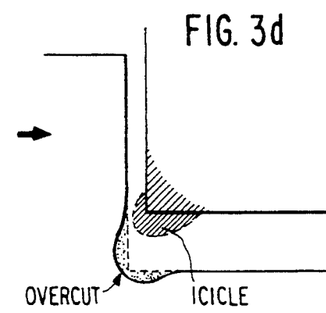

As shown in FIG. 3a, an electrode having a high-tolerance corner contour experiences its largest discharge current density in the corner region. Typically, as mentioned above, the electrode is made of a graphite material. Such material has low heat dissipation characteristics. As a result, the corner region of the electrode reaches temperatures in excess of 800° C. At this temperature, pyrographite (carbon) material begins to adhere to the corner surface, as shown in FIG. 3$b$. As the buildup increases, the deposits begin to deform the shape of the original contour of the electrode, as shown in FIG. 3$c$. At the corner region, the pyrographite deposits form what is known as an "icicle" which begins to deform the contour of the workpiece during the machining process, resulting in an overcut of the contour, as shown in FIG. 3$d$. Typically, the pyrographite forms from the hydrocarbon in the dielectric machining solution found in the gap 20 between the electrode 10 and the workpiece 14. Where the workpiece is iron or steel, the icicle may be formed of the sludge found in the inter-electrode gap 20 instead of the carbon.

In order to accurately machine the workpiece, a visual inspection of the electrode 10 must be made periodically by an operator. As a result, the machining rate of the workpiece is reduced. The periodic interruption is significant in that only 20 minutes of operation is enough to generate an icicle having a significant buildup such that the accuracy of the machining contour will be affected.

SUMMARY OF THE INVENTION

It is an object of the present invention to overcome the foregoing problems of the prior art by providing a machining apparatus that automatically detects pyrographite buildup on a machining electrode.

It is also an object of the present invention to provide a machining apparatus that automatically detects erosion of an electrode during a machining operation.

It is a further object of this invention to provide a machining apparatus for optimizing the machining rate of a workpiece in accordance with the amount of pyrographite buildup, electrode erosion, or both.

The above and other objects of the invention can be achieved by providing an apparatus for and method of optimizing the machining of a workpiece by applying electric current to the electrode workpiece and electrode through a machining solution in accordance with a plurality of machining parameters. In accordance with the present invention, a touch-type sensor is employed to detect the precise location of a corner of a machining electrode that may be susceptible to pyrographite buildup prior to actual machining of the workpiece. By detecting the precise location in this manner, a base or origin value can be maintained for subsequent comparison when the electrode is periodically checked for icicle formation or electrode erosion. When a deviation from the base or origin value is determined, one or more of a plurality of machining parameters, such as machining ON time, fluid flow rate, or jumping height or frequency is modified in accordance with the amount of deviation detected. Control of the ON time has been found to be the most effective method of icicle control, and is preferred to the other techniques, which are primarily are temperature control techniques which control icicle formation indirectly by attempting to limit the operating temperature of the electrode to values at which icicle formation is not significant.

In order to further optimize the machining rate of the workpiece, the surface area of the electrode within the workpiece is periodically determined. The aforementioned machining parameters are varied accordingly, so that the optimum average current across the inter-electrode gap, as it relates to surface area, may be maintained.

Furthermore, in accordance with the present invention, the temperature at the surface of the machining electrode can be periodically determined. As the temperature at the surface approaches the critical temperature for pyrographite buildup and a like, machining parameters such as the OFF time, the jump value and the dielectric flow rate can be modified to achieve the optimum machining rate.

DESCRIPTION OF THE PREFERRED EMBODIMENTS OF THE INVENTION

Figure 4:
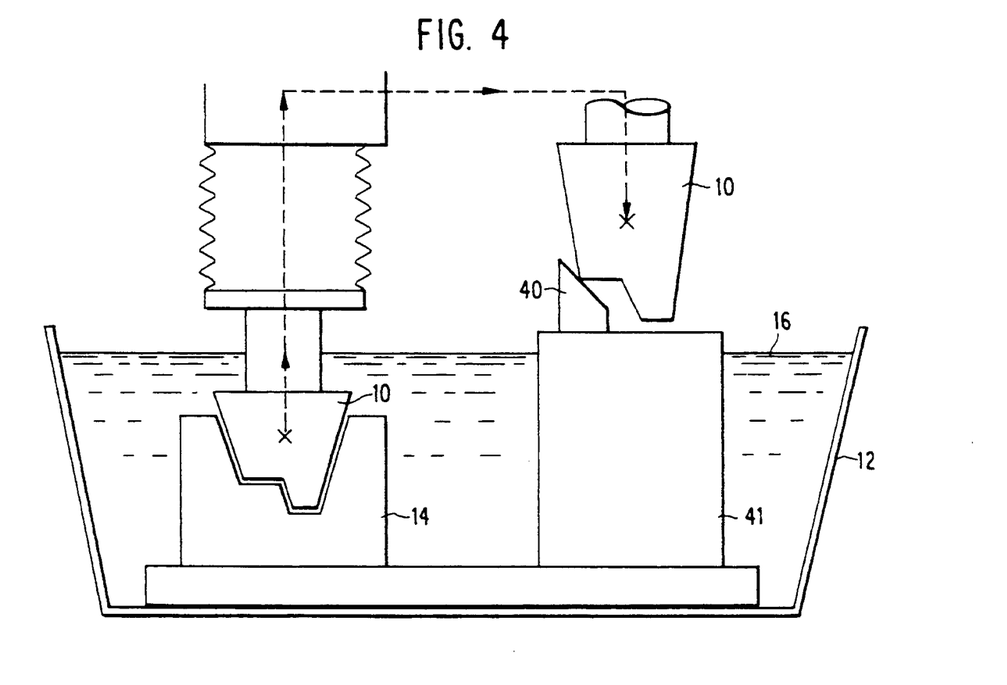
FIG. 4 illustrates a touch-type sensor used in accordance with the present invention.

As shown in FIG. 4, prior to machining of workpiece 14 by electrode 10, the electrode 10 is moved to a detecting station 41. The electrode 10 is moved under control of a numerical control device (not shown) as is well-known in the art, to a position directly above a touch-type sensor 40 mounted on the detection station 41. The electrode 10 is then lowered until its corner section touches the inclined surface of the touch-type sensor 40. At this time, the spatial coordinates (x,y coordinates) corresponding to the location of the electrode 10 at the point of contact with the touch-type sensor 40 becomes the base or origin value. A similar value is obtained for each surface area of the electrode 10 that may be susceptible to pyrographite buildup, electrode erosion, or the like. Once all of the required origin points are determined, the electrode 10 is repositioned above the workpiece 14 and submerged in the machining solution 16 of tank 12 to commence a machining operation on the workpiece 14, as is well-known in the art.

Periodically, the machining operation is interrupted, and the electrode 10 is again moved to a position above the touch-type sensor 40 of the detecting station 41. Similar to the initial operation described above, the electrode 10 is lowered until a corner area of the electrode 10 comes into contact with the inclined surface of the touch-type sensor 40. At the point of contact, the movement of the electrode 10 is stopped, and the position of the electrode (i.e., its x,y coordinates) is calculated. The position thus calculated is then compared to the base or origin value initially set prior to the machining operation.

Figure 5A:
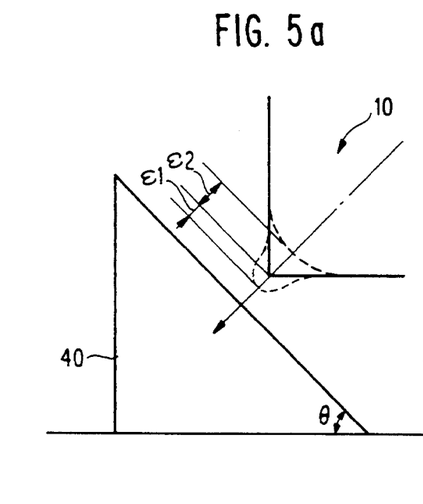
FIGS. 5a and 5b illustrate use of the touch-type sensor in detecting pyrographite buildup and electrode erosion.
Figure 5B:
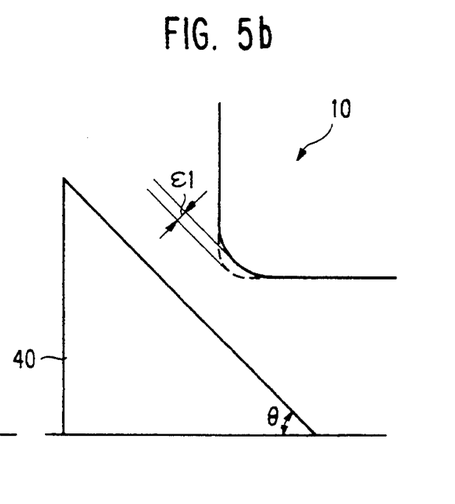

As shown in FIG. 5a, any significant pyrographite buildup $\epsilon$ of the electrode 10 will be detected by the inclined surface of the touch-type sensor 40. The size of the buildup $\epsilon$ can easily be determined by comparing the position of the electrode 10 at the point where the pyrographite buildup touches the inclined surface, with the position of the electrode at the base or origin position. Similarly, as shown in FIG. 5b, any erosion of the electrode 10 can be determined using the same technique. That is, the electrode 10 can be moved to a position directly above the touch-type sensor 40, and lowered in the same fashion described above. The position of the electrode 10, however, at the time the electrode contacts the inclined surface of the touch-type sensor 40 will determine the amount of erosion, as opposed to the amount of buildup found on the corner area of the electrode 10. For the purposes of this example, the icicle formation detected by the inclined surface of the touch-type sensor 40 can be determined when the deviation value $\epsilon$ is less than 0. Similarly, erosion of the electrode 10 at the same region can be determined from a deviation value $\epsilon > 0$. As will be described in more detail below, the detection of pyrographite buildup, erosion of the electrode, or both, can be used to determine the optimum parameters for machining the workpiece.

Figure 6:
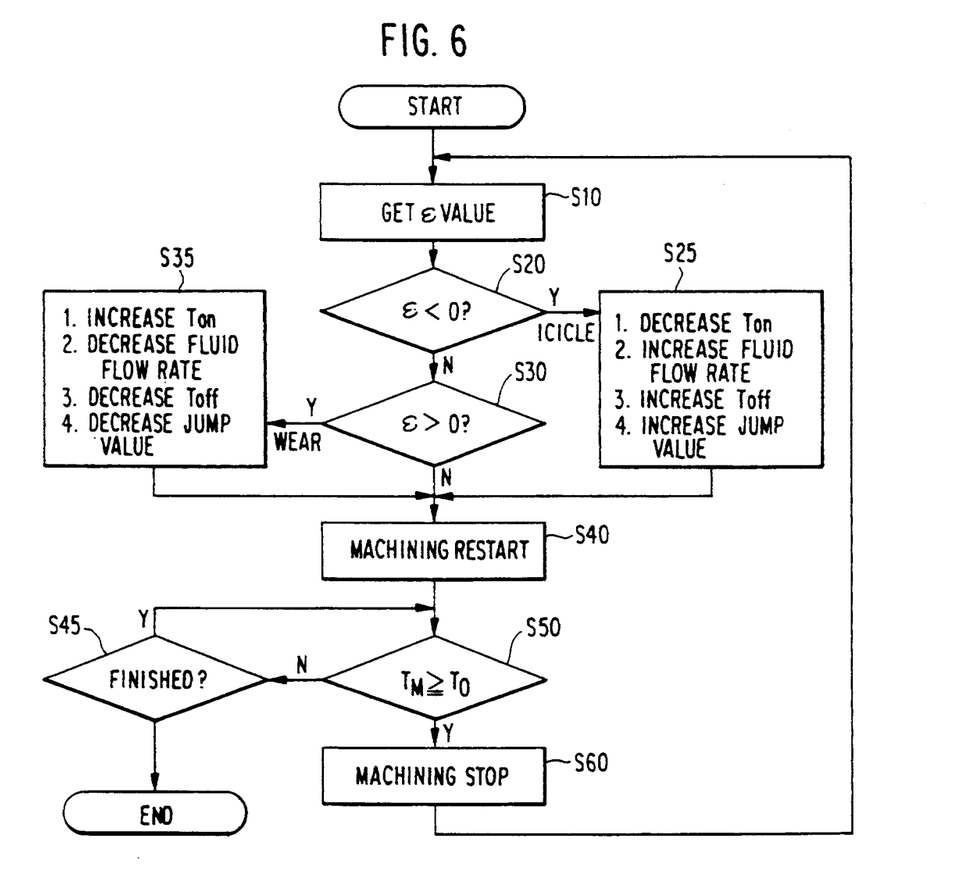
FIG. 6 illustrates an operational flow chart for optimizing the machining rate in accordance with the deviation of a value output by the touch-type sensor, shown in FIG. 4.

With reference to the operational flow chart shown in FIG. 6, the operation of the present invention will now be described. It is assumed that the initial base or origin position of the machining electrode has been set prior to performing the steps shown in the flow chart of FIG. 6. It is also assumed that a first machining period has been carried out and that the machining operation is temporarily interrupted to detect either pyrographite buildup or electrode erosion at the pertinent area of the electrode.

In step S10, a deviation value $\epsilon$ is detected using the touch-type sensor 40, or the like, as described above. At step 20, the deviation value $\epsilon$ is compared with the 0 reference value to determine if an icicle formation is present. If indeed an icicle formation is present, one or more of the machining parameters is varied accordingly in step S25 to optimize the machining of the workpiece. For example, the period of time ($\tau_{on}$) in which the electrode 10 is machining workpiece 14, may be decreased, the rate in which the machining fluid is injected into the machining gap (known as the fluid flow rate) may be increased, the time period ($\tau_{off}$) in which the machining electrode 10 is not in a position to machine the workpiece 14, may be increased, and the height in which the machining electrode 10 is repetitively raised and lowered (known as the jumping value) can be increased. Any or all of these parameters may be modified to compensate for the pyrographite buildup forming at the detected corner of the electrode 10 in order to optimize the machining rate of the process. The most preferred method of control is that of ON time control, because it has been found that such control is highly effective in icicle control. ON time is closely related to the wear ratio of the electrode, which is a measure of the amount of wear experienced by the electrode related to the amount of workpiece removal. Control over the wear ratio in this fashion (i.e., increasing the wear ratio by decreasing the ON time) is quite effective in preventing the formation of icicles or in reducing icicle size, particularly in the case of graphite electrodes. In the case of copper electrodes, this technique is not as preferred because a wear increase is not as acceptable with such electrodes. Other parameter controls, such as control over the jumping value, fluid flow rate and the OFF time, are primarily a form of temperature control, which affects icicle formation indirectly by limiting the working temperature of the electrode. As previously noted, pyrographite formation only takes place at high temperatures, on the order of 800 degrees C.

Returning to FIG. 6, if the deviation value is found to be greater than or equal to 0, a determination is made at step S30 as to whether or not the same region of the electrode 10 has been eroded. Thus, at step S30, the deviation value $\epsilon$, determined in step S10, is compared with the 0 reference value. If no erosion is detected, i.e., $\epsilon = 0$, no adjustments to the machining parameters need be made. If, however, $\epsilon$ is determined to be greater than 0, a portion of the electrode 10 is determined to be eroded, and the machining parameter $\tau_{on}$ may be increased to optimize the machining rate in step S35, and/or the fluid flow rate, jump value or OFF time may be decreased.

In any event, the machining operation is restatted in S40. In S50, a machining time $T_M$ signifying the time since the last check for pyrographite buildup or erosion is compared to a predetermined interval time $T_0$. If a negative determination is made, a check is made to determine if the machining operation is finished in step S45. If the machining operation is finished, the operational flow is terminated. If the machining operation, however, is not finished in step S45, then the operational flow returns to step S50. If an affirmative determination is made in step S50, the machining operation is interrupted in step S60 and the electrode 10 is moved into a position above the touch-type sensor 40 (FIG. 4) to begin processing at step S10, as described above.

In another embodiment of the present invention, the machining rate of the workpiece is optimized by controlling the average current $\bar{I}$, which is the average current passing through a resistor 18c (FIG. 1) in a controller 18 throughout the machining process. In accordance with this embodiment of the invention, the average current $\bar{I}$ is controlled in accordance with the surface area of electrode 10 used to machine the workpiece 14 (FIG. 4).

Figure 8A:
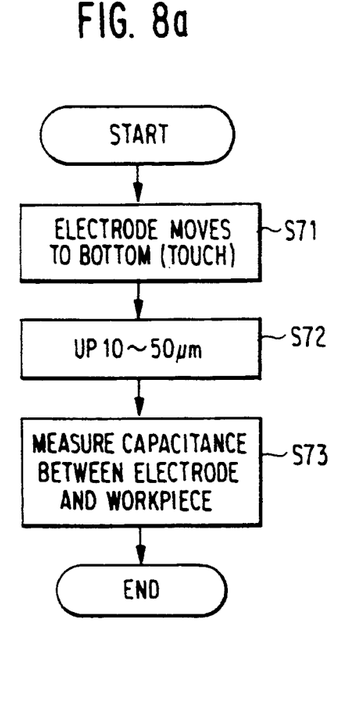
FIG. 8a illustrates an operational flow chart for detecting the present effective surface area of the electrode using the measured capacitance of the inter-electrode gap.
Figure 8B:
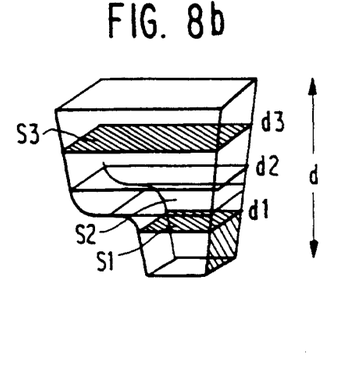
FIG. 8b illustrates a plurality of surface area divisions of the machining electrode.

As shown in FIG. 8b, the surface area of the electrode 10, which is used during the machining of the workpiece 14 (FIG. 4), can be determined by detecting the depth d in which the electrode 10 is within the workpiece. As the depth d increases, for example, from $d_1$ to $d_3$, the corresponding surface area that is actually used for machining of the workpiece 14 increases from area $S_1$ to area $S_3$.

Figure 8C:
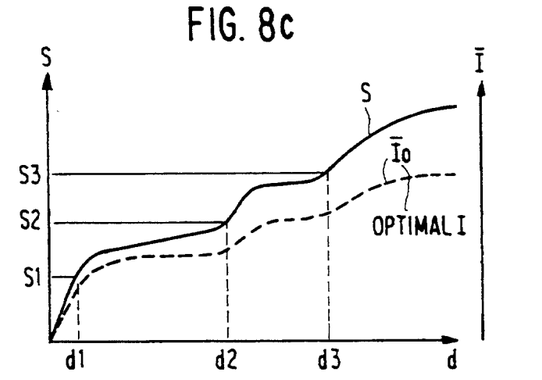
FIG. 8c illustrates the relationship among the surface area, electrode depth, and average machining current $\bar{I}$.

The relationship between the depth d and the corresponding surface area S of any given electrode is determined by the contour or the shape of the electrode. As shown in FIG. 8c, the surface area can be graphed as a function of the depth. Furthermore, the average current $\bar{I}$ varies in accordance with variation of the surface area S or the depth d. If the optimum average current $\bar{I}_o$ can be determined, as shown in FIG. 8c as the dashed line, at any given point in the machining process, the machining parameters may be controlled to approach the optimum average current $I_o$.

Figure 7:
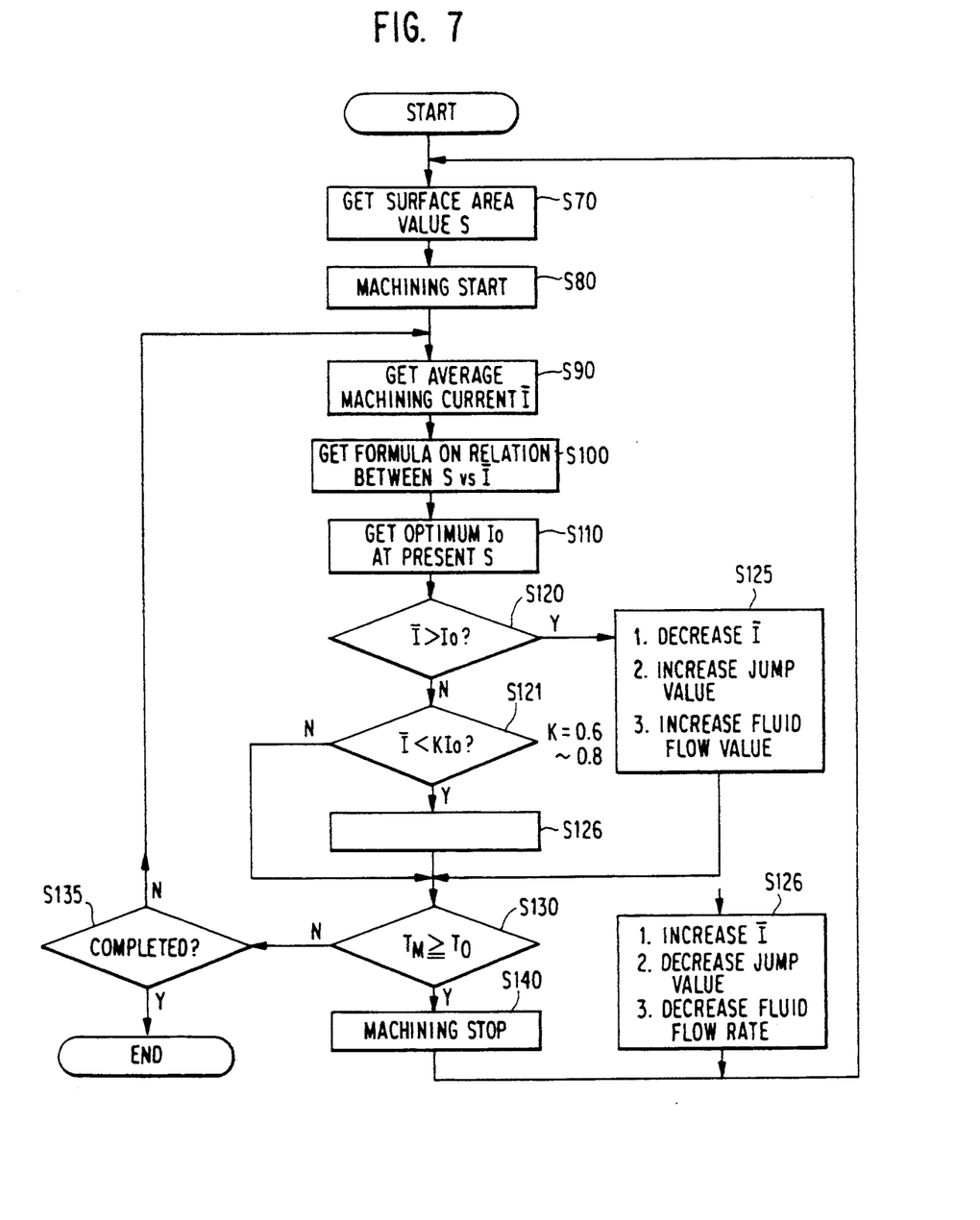
FIG. 7 illustrates an operational flow chart for optimizing a machining current in accordance with the surface area of the electrode then used during machining.

The operation of this embodiment of the invention will now be described with reference to FIG. 7. In step S70, the surface area value S representing the surface area of the electrode 10 actually machining the workpiece 14 is determined. In step S80, the machining operation starts. At step S90, the average machining current $\bar{I}$ is detected. The relationship, for example, as shown in FIG. 8c between the surface area and the average current, is detected in step S100. Using this relationship and the current value S, the optimum average current value $\bar{I}_o$ is determined for that value S at step S110.

If it is determined (step S120) that the average current value $\bar{I}$ is greater than $\bar{I}_o$, the machining parameters are adjusted to compensate for the high current value (step S125). For example, the average current value of the machining operation can be decreased, the jumping value of the electrode 10 can be increased, and the fluid flow rate of the machining solution can also be increased in step S125.

After the machining parameters are adjusted, or if the average current $\bar{I}$ is less than or equal to the optimum average current value $\bar{I}_o$, the machining time $T_M$ is compared to the predetermined interval time $T_o$, in step S130. If the time $T_M$ is less than the interval time, a check is made to determine if the machining operation is completed in step S135. If the operation is not completed, the average machining current $\bar{I}$ is detected again at step S90 and flow continues as described above.

If, however, the actual machining time $T_M$ is greater than or equal to the interval time $T_0$ in step S130, the machining operation is interrupted at step S140. The value of the surface area S of the electrode 10 is then detected in step S70, and the subsequent process steps discussed above are then performed.

Figure 9:
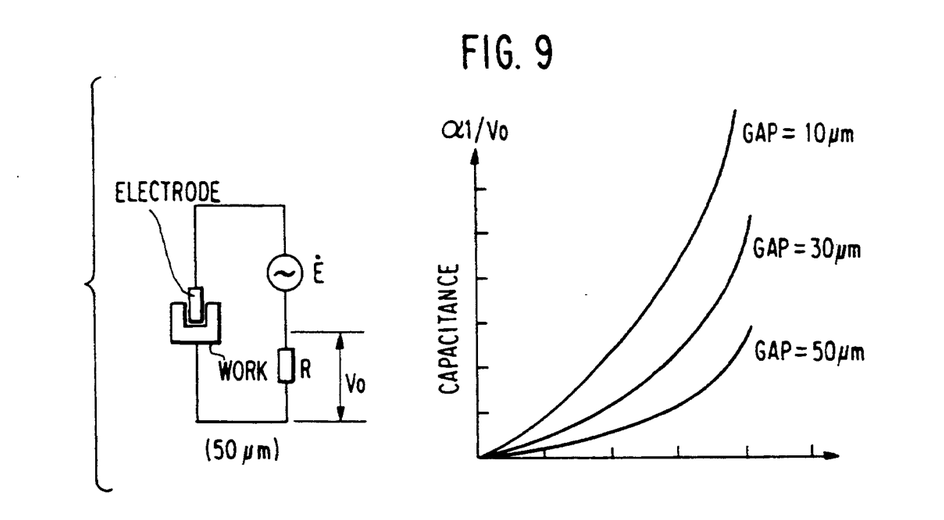
FIG. 9 graphically illustrates the relationship between the capacitance of the inter-electrode gap as a function of the surface area.

In detecting the surface area value S of the electrode 10 during the step S70, the operation illustrated in FIG. 8a may be employed. In step S71, the electrode 10 is moved to the bottom portion of the inter-electrode gap of the workpiece 14 until the electrode 10 touches the workpiece 14. In step S72, the electrode 10 is moved upward between 10 and 50 ·μm. At step S73, the capacitance between the electrode and the workpiece is measured. As shown in FIG. 9, the capacitance measured at various gaps is a function of the surface area of the electrode 10. By detecting the capacitance at a specific gap, the surface area value S can be determined for use in process step S70. In the alternative, the surface area values can be computed from information provided by a CAD/CAM machine, or the like.

Figure 10:
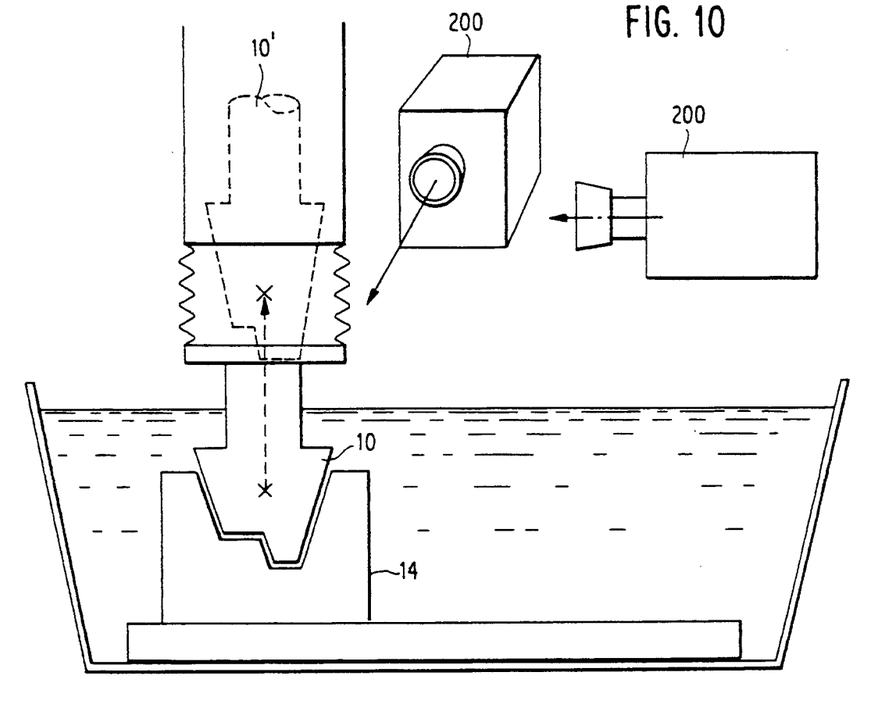
FIG. 10 illustrates an apparatus in accordance with the present invention used to detect the temperature of the machining electrode.

In yet another embodiment of the present invention, the temperature at the surface of the electrode 10 can be used to optimize the machining rate of the workpiece 14. As shown in FIG. 10, the temperature sensors 200 can be of the form of infrared sensors that are used to measure the temperature of specific regions of the electrode 10. For example, the temperature sensor 200 may sense the temperature from the wavelength reflected from a region of the electrode 10. By detecting the temperature of various regions on the electrode 10, the machining rate of the machining process can be optimized to compensate for pyrographite buildup, electrode erosion, or other variations in the machining process, as discussed above.

Figure 11:
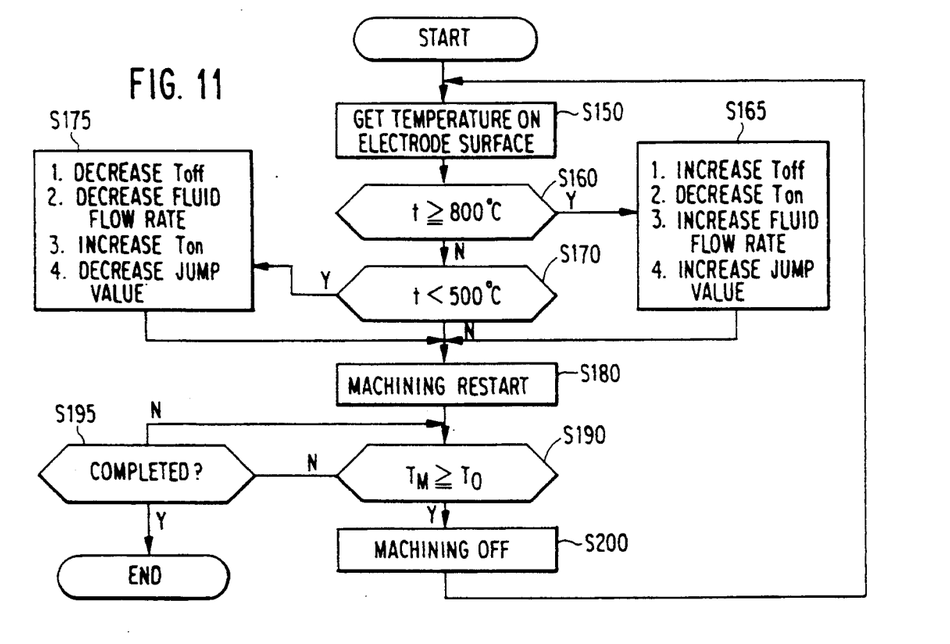
FIG. 11 illustrates an operational flow chart for optimizing the machining rate in accordance with the detected temperature of the electrode.

FIG. 11 illustrates an operational flowchart of this embodiment of the invention. In step S150, the temperature on the electrode surface is detected using, for example, the apparatus illustrated in FIG. 10. The temperature of the electrode surface is compared with the temperature value at which pyrographite buildup occurs (i.e., 800° C.), in step S160. If the temperature t is found to be greater than or equal to 800° C., the same parameters modified in step S25 (FIG. 6) in response to icicle formation on the electrode can be modified in step S165. Thus, machining parameters such as $\tau_{off}$, the fluid flow rate, and the jumping value, can be increased while the parameter $\tau_{on}$ may be decreased in response to the increase of electrode surface temperature. In the event that the temperature is less than 800° C., the temperature is compared to a temperature of 500° C. in step S170. If the determination is affirmative, in step S175, machining parameters such as $\tau_{off}$, the jump value and the fluid flow rate may be decreased, while the parameter $\tau_{on}$ may be increased in response thereto.

In any event, the machining operation is restarred in step S180. At step S190, the machining time $T_M$ is compared to the interval time $T_0$. If the machining time $T_M$ is less than the interval time, a check is made to determine if the machining operation is completed in step S195. In the event that the machining operation is not completed, the determination in step S190 is repeated. If, however, the machining time $T_M$ is greater than or equal to the interval time $T_0$, the machining operation is interrupted in step S200, and the temperature of the electrode surface is again detected in step S150. The process then proceeds in the manner discussed above until the machining operation is completed, as detected in step S195.

From the foregoing discussion of the preferred embodiments of the present invention, it will be apparent that the present invention optimizes the machining rate of a workpiece exposed to a discharge machining process. In accordance with the present invention, various machining parameters can be optimized in response to the detection of pyrographite buildup of a machining electrode, erosion of the machining electrode, or heat buildup of the electrode. Furthermore, the machining removal rate may be optimized by controlling the average current of the machining process as a function of the surface area of the machining electrode used to machine the workpiece.

While the invention has been particularly shown and described with reference to the preferred embodiments described above, it will be understood that various changes in form and detail may be made therein without departing from the spirit and scope of the invention.

What is claimed is:

1. A discharge machining apparatus comprising:
   driving means for moving a machining electrode;
   electrode detector means for detecting variations in the surface of the machining electrode;
   numerical control means for controlling said driving means to move in a direction substantially perpendicular to a workpiece during a machining process, and for controlling said driving means to periodically interrupt the machining process and move the machining electrode towards said electrode detector means so that said electrode detector means can detect any variations in characteristics of the surface area of the machining electrode, wherein said numerical control means varies control of said driving means in accordance with detection of variation made by said electrode detector means, so that an optimal machining process results.

2. The discharge machining apparatus recited in claim 1, further comprising:
   machining fluid injector means for injecting machining fluid into a gap formed by the machining electrode and the workpiece during a machining operation, wherein said numerical control means increases the fluid flow rate of the jets in response to a variation in characteristics of the surface of the machining electrode detected by said electrode detector means in the form of a pyrographite buildup on the electrode surface.

3. The discharge machining apparatus of claim 2, wherein the numerical control means increases a machining time of the machining electrode in response to a variation detected by said electrode detector means in the form of an erosion of the electrode.

4. The discharging machining apparatus of claim 1, wherein said electrode detector means detects a change in the surface area of the of the electrode which is used to machine the workpiece during the machining operation.

5. The discharge machining apparatus of claim 4, wherein said electrode detector means comprises a capacitance measuring device that measures the capacitance between the machining electrode and workpiece to determine the amount of surface area of the electrode used to machine the workpiece.

6. The discharge machining apparatus of claim 1, wherein said electrode detector means comprises a temperature measuring device for measuring the temperature of the surface area of the electrode.

7. A method of discharge machining comprising the steps of:
   moving a machining electrode;
   detecting variations in the surface of the machining electrode;
   controlling motion of the electrode in a direction substantially perpendicular to a workpiece during a machining process; and
   controlling the machining electrode to periodically interrupt the machining process and move the machining electrode so that any variations in the surface area of the machining electrode can be detected during said detecting step, wherein said step of controlling motion of the electrode is performed in accordance with detected variations in the electrode so that an optimal machining process results.

8. A discharge machining apparatus comprising:
   driving means for moving a graphite based machining electrode;
   power supply means for generating a potential difference across a machining gap between said graphite based electrode and a workpiece; and control means for controlling said driving means to move in a direction substantially perpendicular to a workpiece during a machining process, and for controlling pyrographite buildup on said electrode by controlling the wear ratio of said electrode during the process of machining.

9. A discharge machining apparatus comprising:
driving means for moving a machining electrode;
control means for controlling said driving means to move in a direction substantially perpendicular to a workpiece during a machining process, and for controlling pyrographite buildup on said electrode by controlling the operating temperature of said electrode during the process of machining.

10. A discharge machining apparatus comprising:
driving means for moving a graphite based machining electrode;
power supply means for generating a potential difference across a machining gap between said graphite based electrode and a workpiece;
control means for controlling said driving means to move in a direction substantially perpendicular to the workpiece during a machining process, and for controlling pyrographite buildup on said electrode by controlling the on time of individual pulses of said power supply during the process of machining.

11. A discharge machining apparatus comprising:
driving means for moving a graphite based machining electrode;
power supply means for generating a potential difference across a machining gap between said graphite based electrode and a workpiece;
a temperature sensor for sensing a temperature of said electrode; and
control means for controlling said driving means to move in a direction substantially perpendicular to the workpiece during a machining process, and for controlling pyrographite buildup on said electrode by controlling the operating temperature of said electrode during the process of machining, so that the temperature of a body of said electrode does not exceed a temperature at which substantial buildup of pyrographite is possible, by controlling any one or a combination of a jump value, a fluid flow rate of a dielectric fluid and an off time of said power supply.

12. A discharge machining apparatus, comprising:
a graphite based electrode;
a power supply coupled to said electrode to create a voltage difference across a gap defined between said electrode and a workpiece;
means for controlling pyrographite buildup on said electrode and erosion of said electrode by controlling the wear ratio of said electrode.

13. A discharge machining apparatus as claimed in claim 12, wherein said controlling means varies the on time of each individual pulse of said power supply in order to control the wear ratio of said electrode.

14. A discharge machining apparatus, comprising:
a graphite based electrode;
a power supply coupled to said electrode to create a voltage difference across a gap defined between said electrode and a workpiece;
a temperature sensor for sensing a temperature of said electrode; and;
means for controlling pyrographite buildup on said electrode by controlling the operating temperature of said electrode so that the temperature of a body of said electrode does not exceed a temperature at which substantial buildup of pyrographite is possible.

15. A discharge machining apparatus as claimed in claim 14, wherein said controlling means varies at least one of a jump value, a flow rate of a dielectric fluid and an off time of said power supply.

16. A discharge machining apparatus comprising:
power supply means for generating a potential difference across a machining gap between a graphite based machining electrode and a workplace;
driving means for moving said machining electrode;
electrode detector means for detecting variations in characteristics of the surface of the machining electrode during machining;
control means for controlling said driving means to move a workpiece during a machining process, and for controlling pyrographite buildup or erosion on said electrode by controlling any one or a combination of an on time or off time of said power supply means, a jump value of said machining electrode, and a fluid flow rate of a dielectric fluid, in accordance with variations detected by said electrode detector means.

* * * * *